Figure 1:
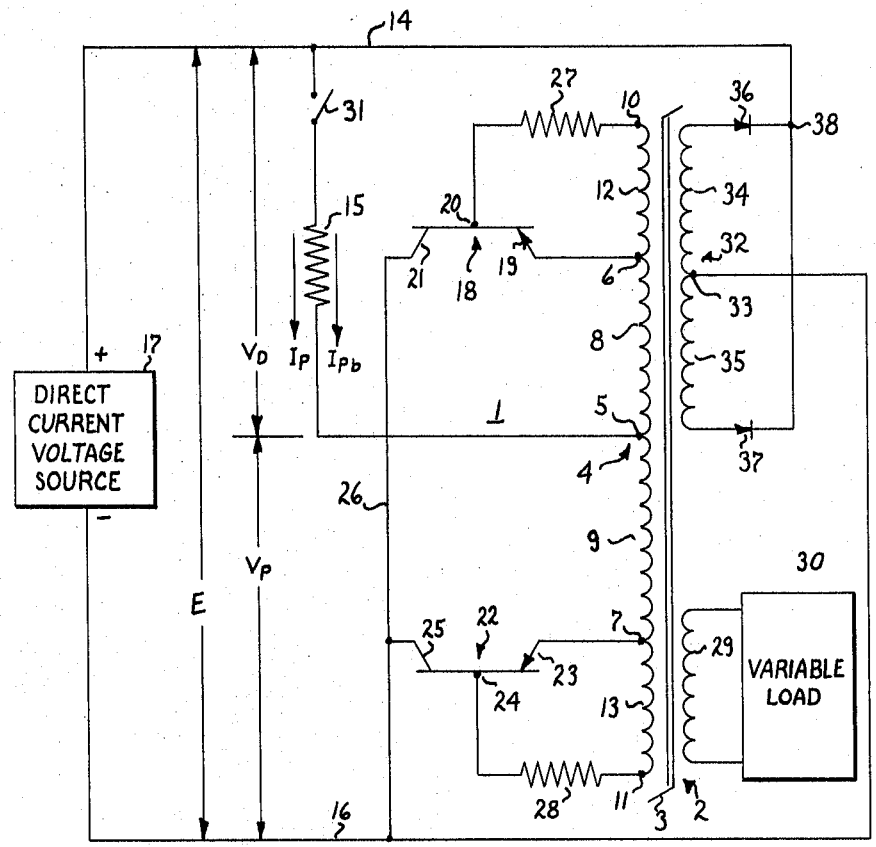

March 22, 1966

W. B. ZELINA 3,242,414

INVERTER

Filed June 1, 1962

INVENTOR.
WILLIAM B. ZELINA

BY Robert H. Montgomery

HIS ATTORNEY

United States Patent Office 3,242,414
Patented Mar. 22, 1966

3,242,414
INVERTER
William B. Zelina, Erie, Pa., assignor to General Electric Company, a corporation of New York
Filed June 1, 1962, Ser. No. 199,545
6 Claims. (Cl. 321—18)

This invention relates to direct current-to-alternating current inverters, and more particularly, to inverters of the type wherein direct current is converted to alternating current by means of alternately saturating the core of a transformer with oppositely directed unidirectional currents.

Inverters of this type, also often referred to as oscillators, generally comprise a saturable core transformer which is alternately saturated in opposite directions by current through a pair of switching devices which control the flow of unidirectional current through the primary winding of a transformer, and which are alternately rendered conductive and non-conductive upon saturation of the transformer core. This type of inverter or oscillator, which may also be used as a direct current-to-direct current voltage converter by rectification of the alternating current output, is well known to those skilled in the art.

Often the direct current supply voltage available to drive this type of inverter or oscillator exceeds the voltage capability of the switching devices, and hence some sort of voltage divider or voltage dropping arrangement is necessary to provide operation of the switching devices within their voltage capabilities. However, use of resistance voltage divider arrangements requires that many watts must generally be dissipated in the voltage dropping arrangement if the voltage supplied to the inverter is to remain reasonably constant under varying load conditions.

If the inverter load were to be constant, a simple series resistor could be used to provide a voltage drop between the voltage source and the inverter and thus limit the voltage applied to switching devices. However, in many applications the loading on the oscillator does not remain constant, and this seemingly simple dropping resistor arrangement is not a satisfactory solution to the problem.

Oscillator power supplies have been constructed which utilize a Zener diode as a voltage stabilizing element together with a series dropping resistor. However, the power dissipated in the Zener diode and the resulting size and cost of the Zener diode becomes excessive where the oscillator operates at light loads but must be capable of handling heavy loads.

In view of the aforementioned limitations in attempting to match an inverter to an existing voltage source which exceeds the voltage capabilities of the inverter switching devices, this invention provides a new and improved inverter or oscillator wherein the inverter supply voltage is independent of the load from zero load up to a predetermined maximum load.

Accordingly, it is an object of this invention to provide an improved inverter of the type described wherein the driving voltage is made independent of the load current.

It is a further object of this invention to provide an improved inverter of the type described wherein the inverter is supplied a driving voltage from a non-regulated voltage source, which driving voltage is independent of load.

It is another object of this invention to provide an improved inverter of the type described wherein a driving voltage, independent of load, may be derived through a dropping resistor connectable to a voltage source having a voltage rating which exceeds the voltage handling capabilities of the inverter switching devices.

Briefly stated, the invention in one form thereof provides a means for deriving a voltage proportional to the voltage of the direct current voltage source, and utilizing this derived voltage to regulate the voltage drop across a voltage dropping resistor to thereby maintain the voltage applied to the inverter constant and independent of load.

The features of the invention which are believed to be novel are pointed out with particularity in the claims which are appended to and form a part of this specification. However, the invention, together with its organization and operation and further objects and advantages thereof, may best be understood by reference to the following description taken in conjunction with the drawings wherein:

FIG. 1 schematically illustrates an inverter embodying the invention; and

Figure 2:
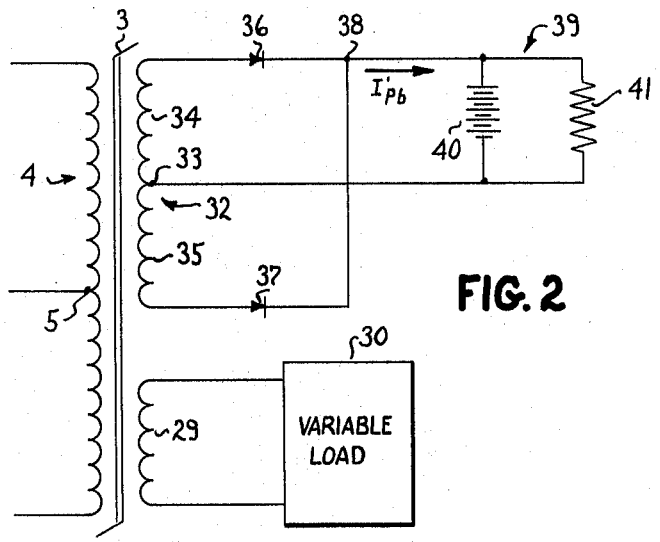

FIG. 2 illustrates, schematically, a second embodiment of the invention.

Referring now to FIG. 1, a direct current-to-alternating current inverter 1 is illustrated. The inverter 1 comprises a transformer 2 having a saturable magnetic core 3 of generally rectangular hysteresis characteristic, a primary winding 4 having a center tap 5, and further taps 6 and 7 thereon defining primary winding portions 8 and 9 respectively, and terminals 10 and 11 which, together with taps 6 and 7, define feedback windings 12 and 13, all respectively. The center tap 5 is connected to a positive direct current (D.C.) bus 14 through a voltage dropping resistor 15. Positive bus 14 and negative bus 16, which may be grounded, are connectable to a direct current voltage source 17, shown in block, which places a voltage E across busses 14 and 16 which is greater than the voltage handling capabilities of the inverter switching devices.

The inverter 1 further comprises a switching device illustrated as a transistor 18 having emitter, base and collector electrodes 19, 20 and 21 respectively, and a second switching device, transistor 22, having emitter, base and collector electrodes 23, 24 and 25 respectively. The collectors 21 and 25 of transistors 18 and 22 respectively are commonly connected to line 26 which is in turn connected to negative bus 16. Terminal 10 of primary winding 4 is connected to the base 20 of transistor 18 through a biasing resistor 27, and terminal 11 of primary winding 4 is connected to base 24 of transistor 22 through biasing resistor 28. The transformer 2 further comprises at least one load or secondary winding 29 supplying a variable load 30. It will be understood that the load 30 may be a direct current load which receives a rectified output from winding 29.

The inverter thus far described is well known to those skilled in the art, and its operation will be only briefly described. Assume that tap 5 is connected to bus 14 through a switch 31 and that slight inherent unbalances in the circuit favors current conduction through transistor 18, current will flow from bus 14 to tap 5, through primary winding portion 8, emitter 19 and collector 21 to negative bus 16. The feedback winding 12 is so connected that the voltage across resistor 27 is positive with respect to base 20. Therefore, as current flows through transistor 18, the feedback winding 12 provides positive feedback to base 20, which increases current conduction through transistor 18. During the conduction of transistor 18, the current through the emitter-collector circuit of transistor 18, due to the voltage at tap 5, is limited primarily by the impedance of the inductance of this current path so that the current is continually increasing so long as transistor 18 continues to conduct and transistor 18 is saturated. When the transformer core becomes saturated by the current through winding 8, the voltage developed in feedback winding 12 will no longer bias transistor 18 to enhance current flow, and the base 20 an demitter 19 of transistor 18 therefore attain substantially the same potential and transistor 18 ceases to conduct. The collapse of flux in the core 3 induces a voltage in feedback winding 13 which biases emitter 23 of transistor 22 positive with respect to base 24, and current now flows in primary winding portion 9 through the emitter-collector circuit of transistor 22 through line 26 to negative bus 16. The circuit action described is regenerative in that as one transistor turns on it tends to turn off the other transistor and vice versa, and a rectangular wave form alternating current voltage is induced in secondary load winding 29.

It is well known that this type of inverter provides an alternating current output having a frequency determined by the input voltage, the primary turns of the transformer, the cross-sectional area of the core 3 and the saturating flux density of the core material, and it is therefore apparent that the variable parameter is supply voltage. If the load on winding 29 should increase, the current $I_P$ through dropping resistor 15 and the primary winding 4 will increase in view of the increased loading of the transformer 2. The increased current through dropping resistor 15 increases the voltage $V_D$ thereacross, which decreases the voltage $V_P$ between tap 5 and negative bus 16. The decrease in the voltage $V_P$ will cause a decrease in the magnitude and frequency of the voltage induced in winding 29. If, on the other hand, the load on winding 29 should decrease, there will be a decrease in the current $I_P$, a decrease in the voltage $V_D$, and an increase in the voltage $V_P$ at tap 5, which will increase the magnitude and the frequency of the voltage induced in winding 29. In many applications where the load device is designed to operate at a constant voltage and/or frequency, the effect of a variable driving voltage $V_P$ is quite undesirable.

This invention provides means for regulating the voltage drop $V_D$ across dropping resistor 15 to an essentially constant value and thereby regulating the voltage $V_P$ applied to tap 5.

In accordance with the illustrated embodiment of the invention, another winding 32 having a center tap 33 defining winding portions 34 and 35 having equal numbers of turns is provided. Windings 34 and 35 are hereinafter referred to as "pump back" windings. The voltage induced in winding 32 is applied to unidirectional conducting devices 36 and 37 which rectify the voltage induced in winding 32. The center tap 33 is connected to negative bus 16 and the rectified output is connected through terminal 38 and bus 14 to the positive side of dropping resistor 15. It may thus be seen that a loop circuit is established from positive bus 14, dropping resistor 15 through the transformer primary winding 4 and pump back windings 34 and 35, rectifier devices 36 and 37, terminal 38, back to bus 14. The pump back windings are selected to have a voltage induced therein which will be equal to or exceed the voltage at bus 14. However, it is readily apparent that in view of the common connection of terminal 38 to bus 14, the voltage at terminal 38 cannot exceed the voltage of bus 14. Hence, from one explanation of the invention, the voltage induced in pump back windings 34 and 35 causes a regulating current $I_{pb}$ to flow in dropping resistor 15. Another view of this circuit operation is to consider the pump back windings as supplying the driving power to the inverter and the bus 14 as supplying the circuit losses.

It will thus be seen that any tendency for the voltage $V_P$ at tap 5 to increase will result in an increase in the voltage induced in pump back windings 34 and 35 and increase the component $I_{pb}$ of the total current through dropping resistor 15. This increase in current through dropping resistor 15 increases the voltage drop $V_D$ thereacross, and hence reduces the voltage $V_P$ at tap 5. In a similar manner, it will be seen that should the voltage $V_P$ decrease, the voltage induced in the pump back windings 34 and 35 will decrease, resulting in a lesser pump back current component $I_{pb}$ through dropping resistor 15, which will result in a decrease in voltage across resistor 15 and hence an increase in the voltage $V_P$ at tap 5.

In this described manner, it may be seen that the voltage drop across the dropping resistor 15 may be regulated constant, and since the voltage E of source 17 is equal to the sum of the voltage across the dropping resistor $V_D$ plus the voltage $V_P$ applied to tap 5, the voltage at tap 5 will be regulated constant, and the primary voltage will be independent of load fluctuation. This may be explained by a simple mathematical analysis as follows:

From FIG. 1 it may be seen that, neglecting winding resistance and the saturated voltage drops across the transistors, and assuming perfect coupling between all windings, if pump back windings 34 and 35 have a peak voltage equal to E, from straightforward transformer theory the maximum voltage that will appear across primary winding 8 or 9 is $$V_P = \frac{N_P E}{N_{pb}} \quad (1)$$

where $V_P$ = the voltage between tap 5 and bus 16
$E$ = the voltage of voltage source 17
$N_P$ = number of turns of each of primary winding portions 8 and 9
$N_{pb}$ = number of turns of each of pump back windings 34 and 35

Since all voltage drops around a closed loop must equal zero, it follows that $$V_D = E\left(1 - \frac{N_P}{N_{pb}}\right) \quad (2)$$

which indicates that the voltage $V_D$ across dropping resistor 15 will be independent of load current and be defined by Equation 2.

The illustrated circuit configuration will provide an input voltage to the oscillator which will be proportional to the direct current supply voltage E, but independent of the load within design limits from no load to a predetermined maximum load. This maximum load is set by the value of dropping resistor 15 and may be defined as $$I_L = \frac{N_P V_D}{N_L R_{15}} \quad (3)$$

where $I_L$ = load current
$N_L$ = number of turns of all load windings
$R_{15}$ = resistance value of resistor 15 which also can be written as $$I_L N_L = N_P \frac{V_D}{R_{15}} \quad (4)$$

which is useful if a plurality of secondary load windings are utilized, in this case $I_L N_L$ is simply defined as the summation of all load ampere turns including the pump back windings and should include the exciting ampere turns of the primary and the transistor feedback ampere turns.

The invention is not limited to the circuit of FIG. 1, but may be utilized in other circuit configurations where the pump back windings may be connected to a receptive voltage source, a receptive voltage source being defined as a voltage source that may receive power and has a load thereon, and a fixed voltage rating, where the load on the receptive voltage source is equal to or greater than the pump back current. It will be seen that the circuit of FIG. 1 meets these criteria.

Reference is now made to FIG. 2 which illustrates a modification of the circuit of FIG. 1. In FIG. 2 a receptive voltage source 39 illustrated as a battery 40 with a resistive load 41 thereon, is connected across terminal 38 and center tap 33. It will be noted that in FIG. 2 there is no direct electrical connections between the pump back windings 34 and 35 and busses 14 and 16, as illustrated in FIG. 1.

In FIG. 2 the pump back windings are selected to have a voltage induced therein, as hereinafter explained. Assume that the circuit of FIG. 2 is supplying the load 30 at a desired voltage and the load increases, thereby causing the primary current $I_P$ (FIG. 1) to increase, which increases $V_D$ and decreases $V_P$. However, as $V_P$ decreases, the voltage induced in pump back windings 34 and 35 decreases, which results in a decrease in current $I'_{pb}$ to the receptive voltage source 39 and a resultant decrease in the load ampere turns $I_L N_L$. From Equation 4 it may be seen that as $I_L N_L$ decreases, the voltage $V_D$ across dropping resistor 15 decreases and the voltage $V_P$ at tap 5 rises to supply the increased load. If the load 30 should now decrease, current $I_P$ will decrease and the voltage $V_P$ at tap 5 will increase, increasing the voltage induced in pump back windings 34 and 35, and therefore the current $I'_{pb}$ supplied to the receptive voltage source 39 will increase. When $I'_{pb}$ increases, $I_P$ increases and the voltage $V_P$ at tap 5 decreases.

Where a receptive voltage source is utilized which is independent of the inverter supply voltage, the number of turns of the pump back windings may be determined as follows:

The voltage rating $E_S$ of the receptive voltage source will be known as well as the frequency $f$ at which the inverter or oscillator is to operate. Then, neglecting the voltage drop of the rectifiers connected to the pump back windings, transposing and integrating the known equation $$E_S = N_{pb}\frac{d\phi}{dt} \quad (5)$$

$$Es\Big]_{t_1}^{t_2} = N_{pb}\phi\Big]_{\phi_1}^{\phi_2}$$

$$E_S \Delta t = N_{pb}\Delta\phi \quad (6)$$

$\Delta t = t_2 - t_1$
$\Delta\phi = \phi_2 - \phi_1$

Since the transformer core is driven to saturation in opposite directions $$\Delta t = \frac{1}{2f} \quad (7)$$

It is well known that $$\Delta\phi = 2B_S A \quad (8)$$

where $B_S$ = saturation flux density of the transformer core
$A$ = cross-sectional area of the transformer core then from equations 6, 7 and 8

$$N_{pb} = \frac{E_S}{4B_S A f} \quad (9)$$

It may be seen that the invention provides an inverter or oscillator of the character described wherein the driving voltage remains constant and independent of load current. Otherwise stated, the primary of the transformer sees a constant load even though the load may be varying. The receptive voltage source connected across the pump back windings may be of any form so long as it meets the previously defined parameters. It will be noted that in FIG. 2 the pump back windings are connected to a voltage source of fixed voltage rating which may receive power, and which is connected to a load.

While the invention has been disclosed in preferred embodiments thereof, modifications to the disclosed embodiments of the inventions and other embodiments thereof may occur to those skilled in the art which do not depart from the spirit and scope of the invention. Accordingly, it is intended to cover in the appended claims all embodiments and modifications of the invention which do not depart from the spirit and scope of the invention.

What is claimed as new and is desired to secure by Letters Patent of the United States is:

1. A direct to alternating current inverter comprising:
   (a) a saturable core transformer having primary and load windings;
   (b) switching devices in circuit with said primary winding adapted to direct saturating current to flow in said primary winding in opposite directions upon alternate conducting states of said switching devices;
   (c) means responsive to saturation of said core for alternately controlling conduction of said switching devices;
   (d) circuit means including a voltage dropping resistor for connecting a center tap of said primary winding to a source of unidirectional energy having a magnitude which if connected directly would cause the voltage capabilities of said switching devices to be exceeded;
   (e) an additional winding on said transformer and rectifying means for deriving a unidirectional voltage therefrom; and
   (f) circuit means for connecting said rectifying means to a receptive voltage source to supply electrical energy thereto in accordance with the load on said transformer whereby the output voltage of said rectifying means causes the voltage applied to said primary winding tap to be independent of load current.

2. The inverter of claim 1 wherein said rectifying means are adapted to be connected to the source of unidirectional energy.

3. The inverter of claim 1 wherein said additional winding and said rectifying means supplies driving energy to said inverter and the source of unidirectional energy is adapted to supply the losses of said inverter.

4. The inverter of claim 1 wherein said additional winding and said rectifier means are connectable to a receptive voltage source independent of the source of unidirectional energy.

5. The inverter of claim 2 wherein said additional winding is selected to have a voltage induced therein at least equal to the voltage of the source of unidirectional energy.

6. The inverter of claim 4 wherein said additional winding is selected to have a voltage induced therein at least equal to the voltage of the receptive voltage source.

References Cited by the Examiner

UNITED STATES PATENTS

| 2,852,730 | 9/1958 | Magnuski | 331—113.1 |
| 2,854,580 | 9/1958 | Uchrin et al. | 331—113.1 |
| 2,905,906 | 9/1959 | Kittl | 331—113.1 |
| 2,916,705 | 12/1959 | Morey | 331—113.1 |

LLOYD McCOLLUM, *Primary Examiner.*

A. J. GAJARSA, M. WACHTELL, *Assistant Examiners.*